United States Patent [19]
Vassigh et al.

[11] Patent Number: 5,297,030
[45] Date of Patent: Mar. 22, 1994

[54] METHOD USING BILL AND COIN IMAGES ON A TOUCH SCREEN FOR PROCESSING PAYMENT FOR MERCHANDISE ITEMS

[75] Inventors: Ali M. Vassigh, Duluth; Mark A. Hastings, Lawrenceville; Michael T. Inderrieden, Tucker; Helen Buchanan-Miller, Lawrenceville; David M. Rubini, Smyrna, all of Ga.

[73] Assignee: NCR Corporation, Dayton, Ohio

[21] Appl. No.: 866,650

[22] Filed: Apr. 8, 1992

[51] Int. Cl.⁵ .............................................. G06F 15/21
[52] U.S. Cl. ..................................................... 364/405
[58] Field of Search ................... 364/405, 406, 705.06, 364/709.02, 709.04, 709.11, 709.12, 710.01, 710.02, 710.04; 434/110, 107; 395/155, 156, 161

[56] References Cited

U.S. PATENT DOCUMENTS

| | | | |
|---|---|---|---|
| 3,914,579 | 10/1975 | Shigemori et al. | 364/405 |
| 4,186,774 | 2/1980 | Kashio. | |
| 4,191,999 | 3/1980 | Kashio. | |
| 4,607,335 | 8/1986 | Mizuno. | |
| 4,611,286 | 9/1986 | Nishimura et al. | 364/405 |
| 4,817,041 | 3/1989 | Sakamoto. | |
| 4,862,390 | 8/1989 | Weiner | 395/155 |
| 5,128,862 | 7/1992 | Mueller | 364/405 |

FOREIGN PATENT DOCUMENTS 58-123154  7/1983  Japan.

Primary Examiner—Robert A. Weinhardt
Attorney, Agent, or Firm—Albert L. Sessler, Jr.; Richard W. Lavin

[57] ABSTRACT

In a merchandise checkout system including an electronic cash register having a touch screen panel and a cash till including a plurality of compartments for storing a particular bill or coin denomination, there is disclosed a method for checking out purchased merchandise items including the steps of displaying on the touch screen panel a receipt listing the items purchased together with the amount due, displaying on the panel a plurality of bill denominations which may be submitted by the customer for the purchase of the merchandise items and displaying on the touch screen panel a representation of the cash till together with the particular bill and coin denominations and the number of such denominations which are to be dispensed as the change due the customer in response to the submission of the particular bill denomination by the customer.

16 Claims, 13 Drawing Sheets

FIG. 3

| | |
|---|---|
| HAMBURGER | $0.89 |
| CHEESEBURGER | $1.09 |
| LARGE FRIES | $0.79 |
| MEDIUM DRINK | $0.75 |

FIG. 4

| | |
|---|---|
| HAMBURGER W/O PICKLES | $0.89 |
| CHEESEBURGER | $1.09 |
| LARGE FRIES | $0.79 |
| MEDIUM COKE | $0.75 |

FIG. 5

| | |
|---|---|
| HAMBURGER | $0.89 |
| CHEESEBURGER | $1.09 |
| LARGE FRIES | $0.79 |
| MEDIUM COKE | $0.75 |

FIG. 6

| | |
|---|---|
| HAMBURGER W/O PICKLES | $0.89 |
| CHEESEBURGER | $1.09 |
| LARGE FRIES | $0.79 |
| MEDIUM COKE | $0.75 |

FIG. 7

| | |
|---|---|
| HAMBURGER | $0.89 |
| CHEESEBURGER | $1.09 |
| LARGE FRIES | $0.79 |
| MEDIUM COKE | $0.75 |

FIG. 11G
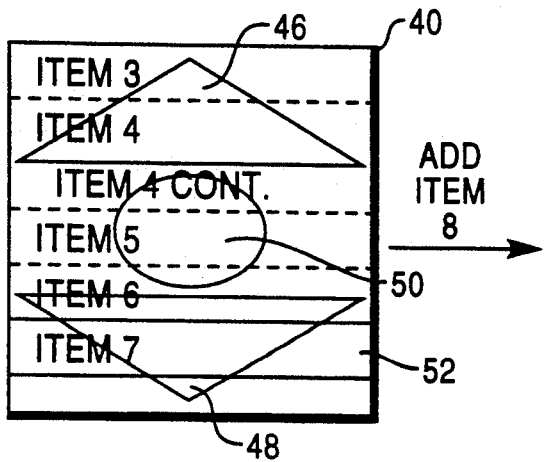
FIG. 11H
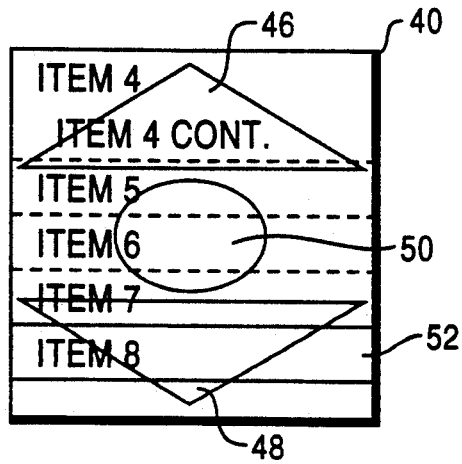
FIG. 12
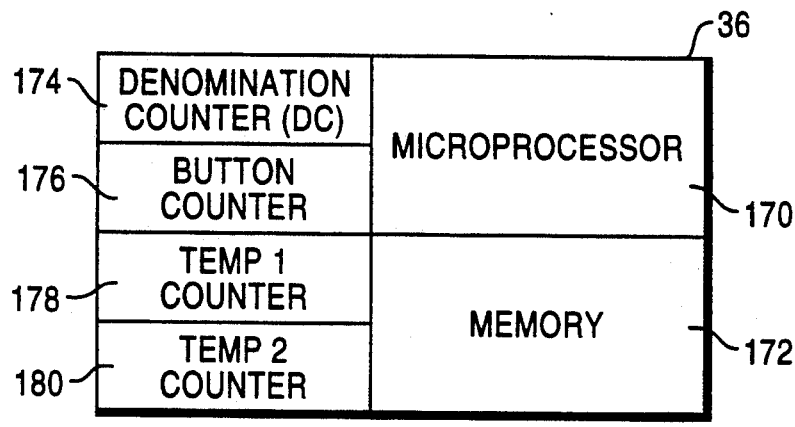
FIG. 13A
| REF DC | CURRENCY DENOMINATION |
|---|---|
| 1 | 0 |
| 2 | .01 |
| 3 | .05 |
| 4 | .10 |
| 5 | .25 |
| 6 | .50 |
| 7 | 1.00 |
| 8 | 5.00 |
| 9 | 10.00 |
| 10 | 20.00 |
FIG. 13B
| REF DC | CURRENCY DENOMINATION |
|---|---|
| 1 | 20.00 |
| 2 | 10.00 |
| 3 | 5.00 |
| 4 | 1.00 |
| 5 | .50 |
| 6 | .25 |
| 7 | .10 |
| 8 | .05 |
| 9 | .01 |

METHOD USING BILL AND COIN IMAGES ON A TOUCH SCREEN FOR PROCESSING PAYMENT FOR MERCHANDISE ITEMS

BACKGROUND OF THE INVENTION

The present invention relates to a data terminal device which processes data pertaining to items ordered as part of a fast food or other type of merchandising operation and more particularly to a checkout operation utilizing a touch screen for displaying a receipt listing the items sold, currency denominations representing possible customer payments for the purchased items and the change due the customer in response to the customer's payment.

Today's developments of point of sale terminal devices include a touch screen, the use of which transfers the function of the keyboard to designated portions of the touch screen. As part of this new development, electronic receipts have been employed which display a list of the items ordered together with functional elements for manipulating the items listed in the receipt. In order for the operators to use these functional elements, more interface objects have been added to the point of sale devices control panel. These interface objects or controls (keys, buttons, knobs, etc.) take up space and are usually laid out close to one another so as to keep most in one location. Until the operators become familiar with the terminal devices control panel layout, much time is spent searching for the appropriate controls. To reduce this search, designers have grouped related buttons, used color coding, etc. Where an electronic receipt is displayed on the touch screen, the size of the typical receipt item is small thereby precluding the use of the human finger as a means to modify the item. At the end of the checkout operation, the total amount of the purchased items is displayed on the touch screen and identified as the payment due by the customer for the purchase of the merchandise items. In most checkout operations the customer will present a currency bill whose denomination is larger than the amount due requiring the operator to enter the payment received from the customer into the terminal device. Upon actuation of a total key on the terminal device, the amount of change due the customer is then displayed requiring the operator to retrieve from the cash drawer located in the data terminal device the number of bills and coins which constitute such change. It is during this payment operation that most of the errors associated with checkout operations are found.

It is therefore a principal object of this invention to provide a method for processing the payment for purchased merchandise items which includes a display for displaying possible payment amounts that may be submitted by the customer for the purchased merchandise items. It is another object of this invention to provide an electronic receipt displayed on a touch screen which allows a receipt item to be easily modified by the operator's finger. It is a further object of the present invention to provide the display of an electronic receipt which includes scrolling buttons which will scroll the receipt when actuated by the operator's fingers. It is another object of this invention to provide a system for dispensing change to a customer which reduces the occasion to make errors in distributing the bills and coins that constitute the change due the customer. It is a further object of this invention to provide a system for displaying the change due which reduces the number of keystrokes required by the operator in processing the payment of the items purchased by the customer which reduces the number of keystrokes required by the operator in processing the payment of the items purchased by the customer.

SUMMARY OF THE INVENTION

These and other objects of the invention are fulfilled by generating on the touch screen of a terminal device a receipt listing all the items either ordered or purchased by the customer. Located within the receipt are integrated scroll buttons, a miscellaneous button for effecting the display of the items in the receipt, a floating highlighted selection bar and item separators. Touching the scroll buttons will scroll the items listed in the electronic receipt. Touching the miscellaneous button will enable one of the items listed in the receipt which has been highlighted to be isolated. The invention further allows a single receipt item to occupy multiple lines. Upon the generation of the amount due for the purchased merchandise, there is generated on the touch screen images of buttons each listing a currency value that may be tendered by the customer as payment for the amount due. In response to the operator touching the particular button representing the currency bill tendered, a new display image will be generated representing the outline of the cash till including bill and coin compartments showing the number of specific bills and coins that are required to be removed as change for the bill tendered by the customer.

BRIEF DESCRIPTION OF THE DRAWINGS

These and other objects, features and advantages of the invention, as well as the invention itself, will become more apparent to those skilled in the art in light of the following detailed description taken into consideration with the accompanying drawings wherein like reference numerals indicate like or corresponding parts throughout the several views and wherein:

FIG. 3 is a diagrammatic representation of an electronic receipt displayed on the touch screen of FIG. 2;

FIG. 4 is a diagrammatic representation of an electronic receipt displayed on the touch screen showing single line items separated by a dotted line together with an item which occupies two lines;

FIG. 5 is a diagrammatic representation of a electronic receipt showing one of the items highlighted;

FIG. 6 is a diagrammatic representation of the electronic receipt showing the highlighting of one item;

FIG. 7 is a diagrammatic representation of the electronic receipt showing the scrolling buttons and the miscellaneous button superimposed on the electronic receipt;

FIGS. 11A-11H inclusive are diagrammatic representation of an electronic receipt showing the highlighting and the movement of various items on the receipt as a result of pressing the scroll buttons and the adding of an item to the receipt;

FIG. 12 is a block diagram of the control unit of FIG. 2 which includes counters, a memory and a microprocessor used in the controlling of the touch screen;

FIGS. 13A and 13B are diagrammatic representations of the tables found in the memory of the control unit for listing the currency denominations available to be submitted by the customer as payment for the purchased items and dispensed as change due the customer;

DESCRIPTION OF THE PREFERRED EMBODIMENT

Figure 1:
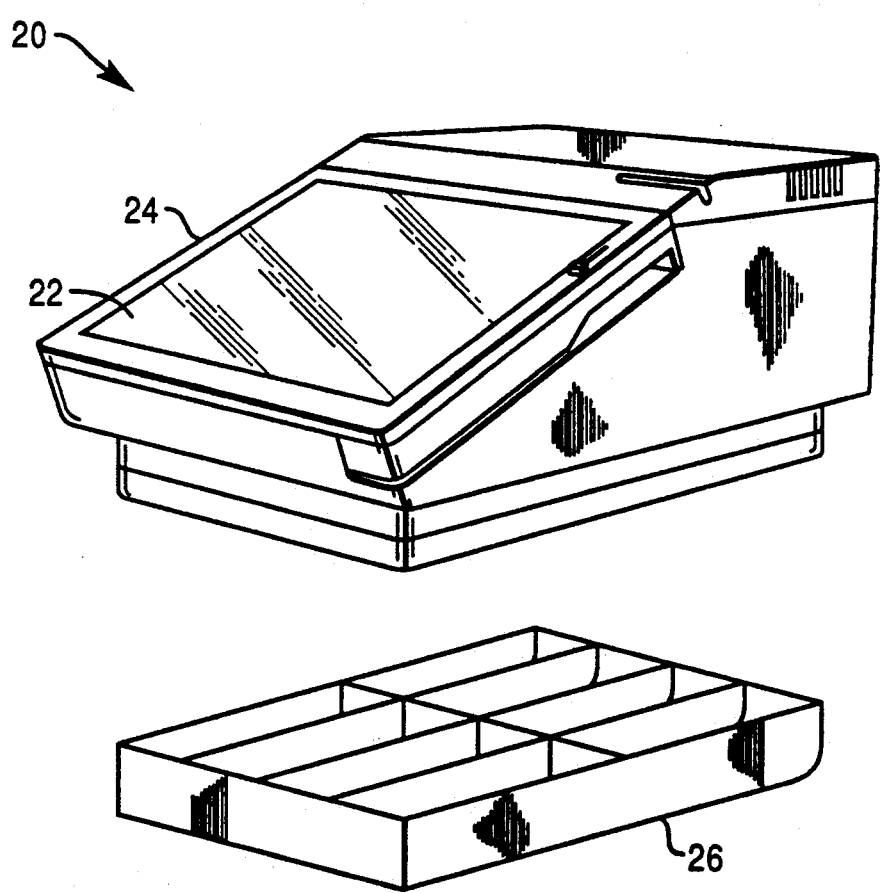
FIG. 1 is a perspective view of a data terminal device together with a removable cash till or drawer associated with the present invention.

Referring now to FIG. 1, there is shown a perspective view of the data terminal device used in the present invention generally indicated by the numeral 20 which includes a touch screen panel 22 mounted in the top surface 24 of the terminal device and a cash till 26 which may be secured to the bottom portion of the terminal device 20 or may be remotely positioned adjacent the terminal device.

Figure 2:
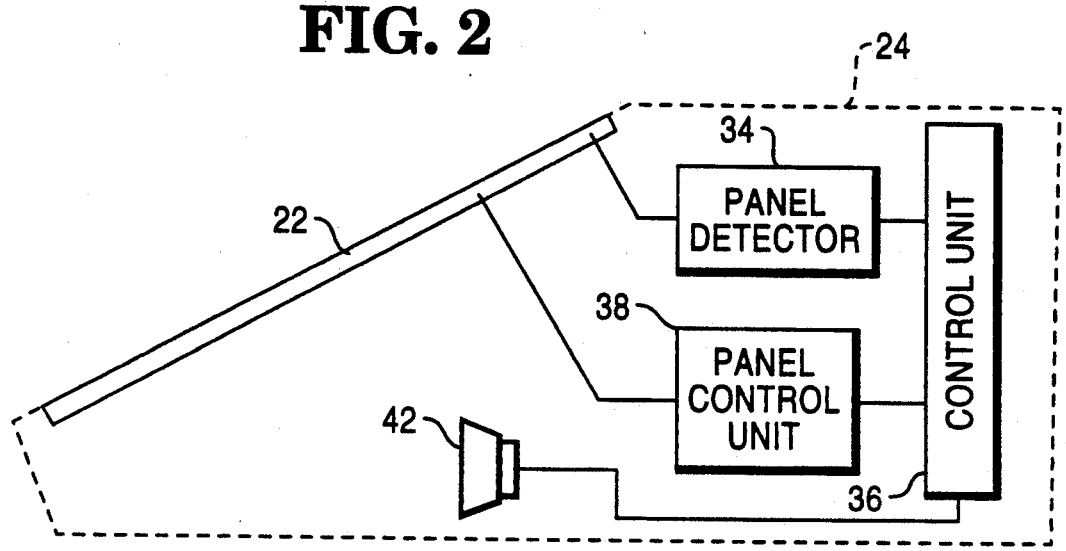
FIG. 2 shows a block diagram of the touch screen associated with the data terminal device of FIG. 1.
Figure 8:
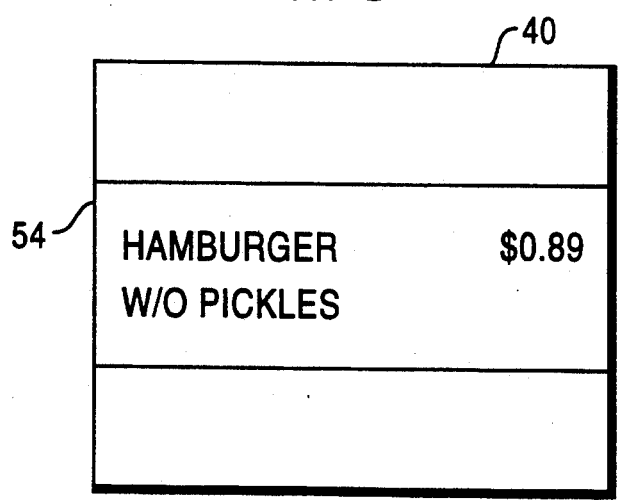
FIG. 8 is a diagrammatic representation of a electronic receipt showing the enlargement of a highlighted item generated as a result of touching the miscellaneous button.

Referring now to FIG. 2, there is shown a block diagram of the touch screen panel 22 which includes a panel detector unit 34 which senses the location of the operator's finger on the panel 22 and generates electrical signals to represent such location for transmission to a control unit 36 which decodes electrical signals for actuating the panel to display information in a manner that will be described more fully hereinafter. The control unit 36, in response to receiving the electrical signals from the panel detector unit 34, will output control signals to a panel control unit 38 which controls the panel to generate a number of displays for processing the purchased items. One of these displays is the electronic receipt 40 (FIGS. 3-11 inclusive) which may list the items ordered by the customer together with the price of the items or any other type of desired information. The control unit 36 may also operate a speaker 42 to generate tone signals representing a successful completion of the reading of the touch screen panel 22 by the control unit 36.

Referring now to FIGS. 3-9 inclusive, there are shown diagrammatic representations of the electronic receipts 40 which may be displayed during an operation of the touch screen panel 22. FIG. 3 shows an electronic receipt in which the items 42 are listed together with their prices 43. When certain items take up more than one line or have several components, an item separator such as the dotted lines 44 (FIG. 4) can help to distinguish one item from another item. Where one of the items is required to be modified or changed, it is obvious that using a finger to select one of the items 42 for the modification would be difficult since the items are so narrow that positioning a finger over one of the items would overlap adjacent items. The present invention provides a pair of scroll buttons 46, 48 (FIGS. 7, 9, 10 and 11A-1F inclusive) comprising directional arrows superimposed on the receipt 40 which, when touched by the operator, will scroll the contents of the electronic receipt or move the highlight bar 52 (FIGS. 11A-11H inclusive) on the receipt. In order to modify a highlighted item such as enlarging an item (FIG. 8), there is superimposed on the electronic receipt between the scroll buttons 48 and 46, a miscellaneous 50 symbol (FIGS. 7, 9, 10 and 11A-11F inclusive,). Where an item is to be highlighted, the use of the scroll buttons 46 and 48 can position a particular item which is to be modified within that highlighted area. Such modifications may include quantity specification, item void, price change, discounts, etc. For example, in order to void the item "large fries" in FIG. 5, the operator may normally be required to press an "item void" key followed by the "large" key and then "fries" keys on the keyboard of a terminal device. This method of modifying an item followed by an item specification can lead to more trouble especially if a particular item needs more than one modification. By utilizing the buttons 46 and 48, the number of keystrokes is reduced thereby increasing the speed of the modification operation.

Figure 9:
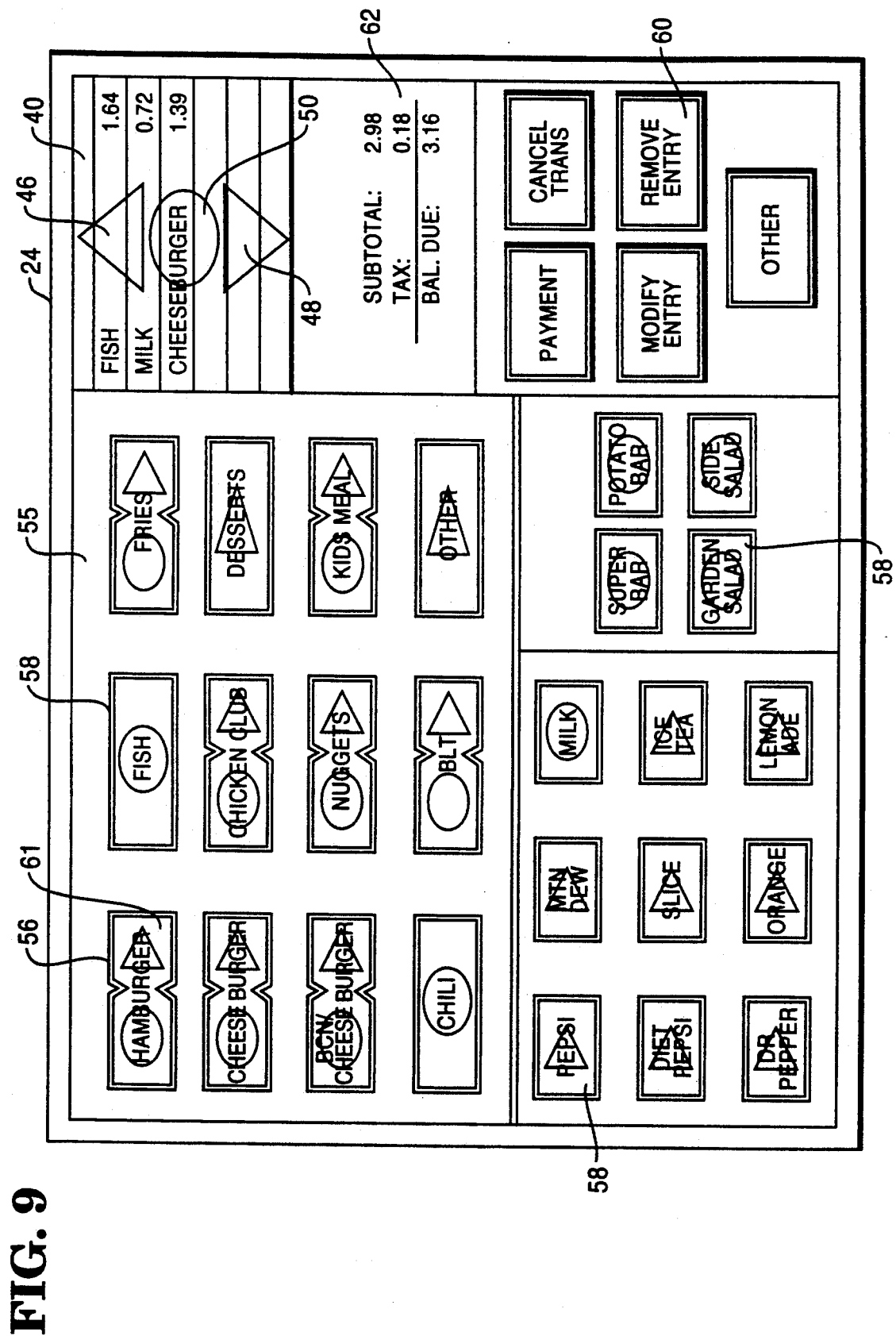
FIG. 9 is a diagrammatic representation of an actuated touch screen display showing the location of the electronic receipt together with buttons including transaction buttons, item ordering buttons and multi-function buttons.
Figure 10:
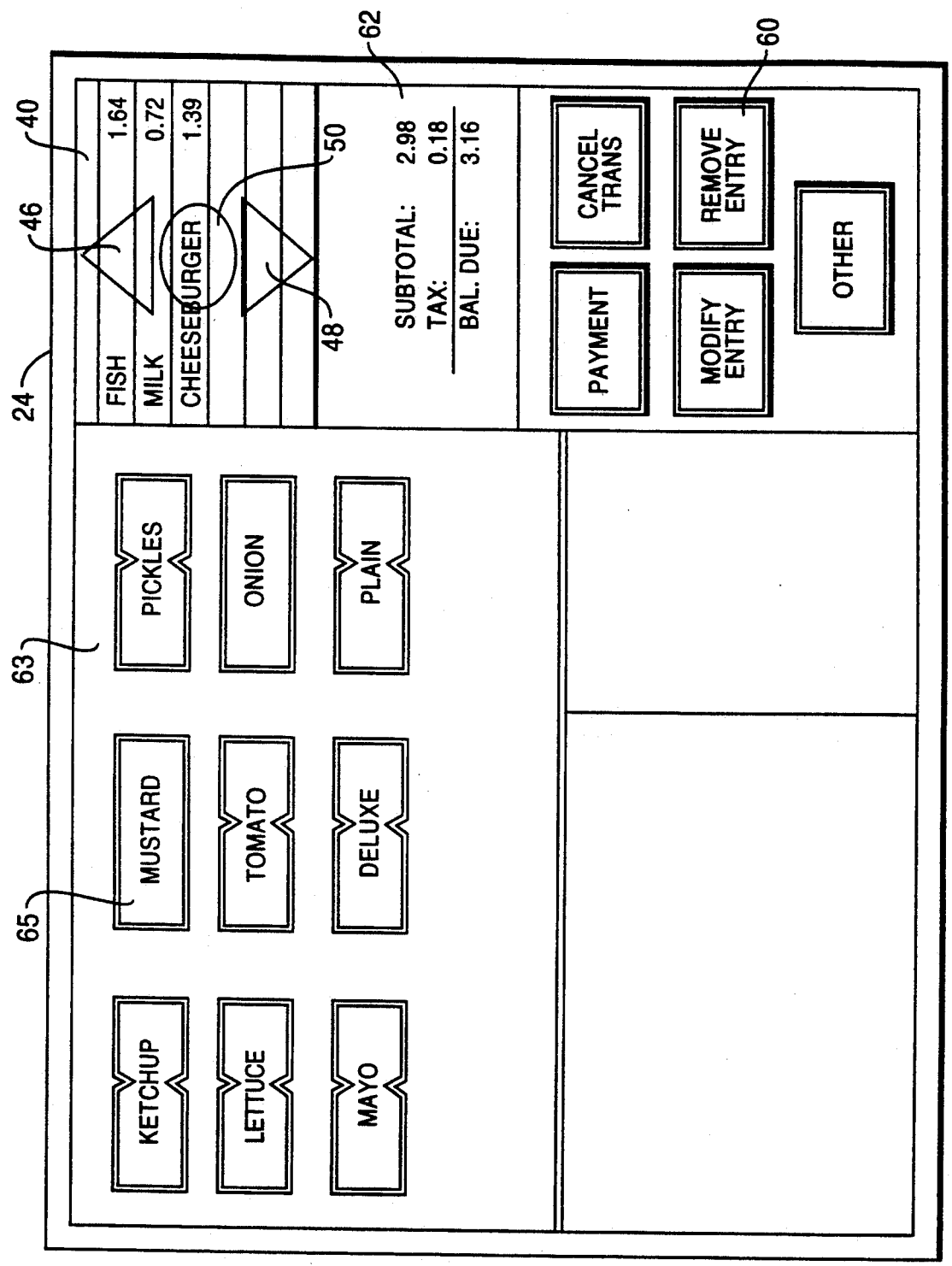
FIG. 10 is a diagrammatic representation of a touch screen display generated as a result of touching the arrow portion of one of the multi-function buttons of FIG. 9.

Referring now to FIG. 9 there is shown a diagramatic representation of a display 55 on the touch screen panel 22 which includes a plurality of multiple function buttons 56, single function buttons 58, transaction buttons or keys 60 and an electronic receipt 40. As shown, the electronic receipt 40 includes the balance due 62 for the items ordered. Touching the arrow portion 61 of the multi-function button 56 representing HAMBURGER will result in bringing up the display 63 (FIG. 10) on the panel 22 displaying condiments buttons 65 which may be touched to complete the order.

Figure 11A:
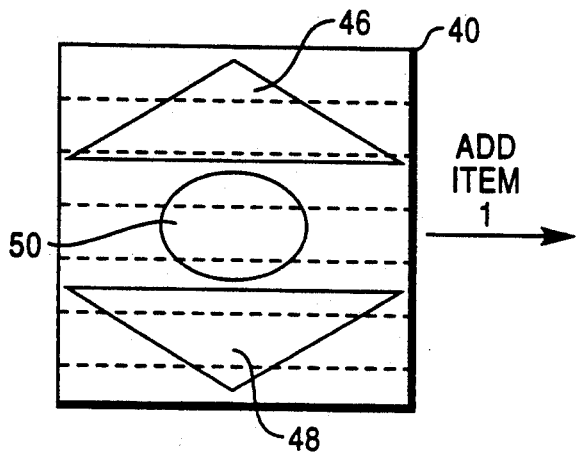
Figure 11B:
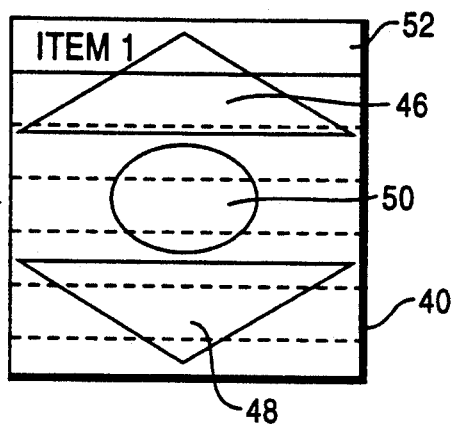
Figure 11C:
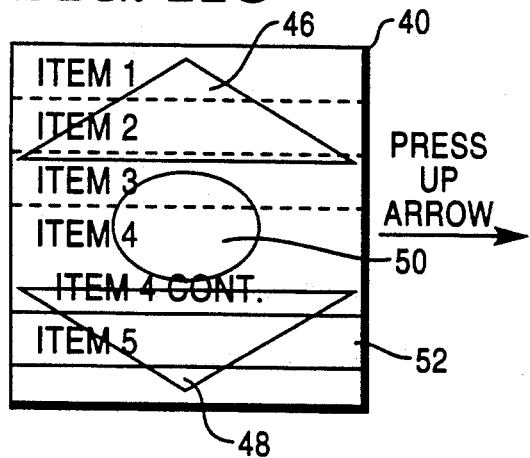
Figure 11D:
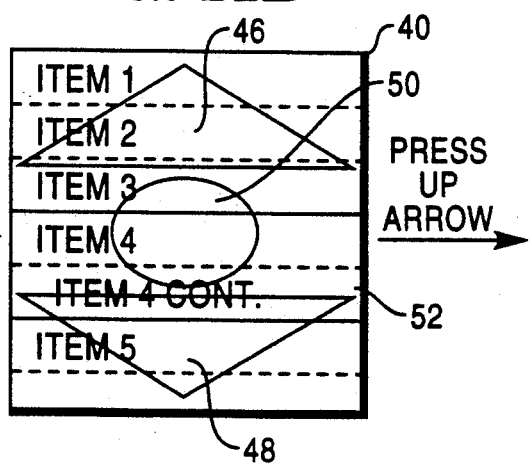
Figure 11E:
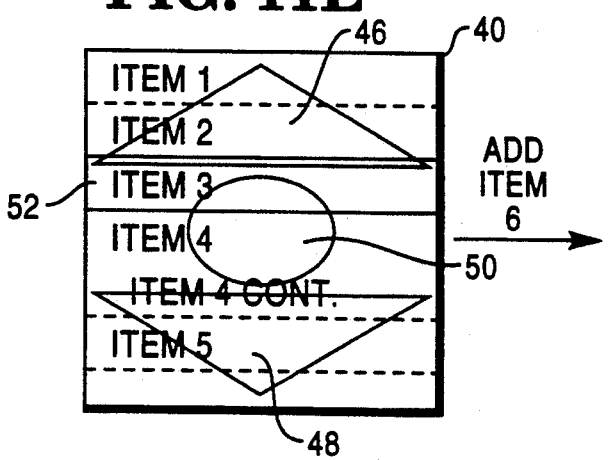
Figure 11F:
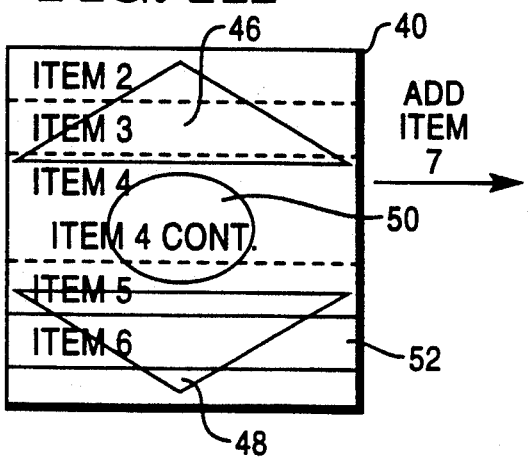

Referring now to FIGS. 11A-11H inclusive, there is illustrated the operation of the present invention in the generation and the moving of the highlight bar 52 through the receipt 40 as a result of touching the scroll buttons 46, 48. The application software for the terminal 20 (FIG. 1) may provide the use of the highlight bar 52 for the receipt or not. As shown in FIGS. 11A and 11B, an item will not be highlighted until it is added to the receipt list. Touching the scroll button 46 will move the highlight bar 52 in an upward direction to highlight items 3-5 inclusive (FIGS 11C-11E inclusive) until it reaches the top of the receipt at which time the items in the receipt 40 will move in an downward direction through the highlight bar 52 (11F-11H inclusive). As items are added or inserted, the position of the highlight bar will change to highlight the last item added or inserted (FIGS. 11E-11H inclusive).

Referring now to FIG. 12, there is disclosed a block diagram of the control unit 36 (FIG. 2) which includes a microprocessor 170, a memory 172, a denomination counter 174, a button counter 176, a TEMP 1 counter 178 and a TEMP 2 counter 180 which are used in the change due operation using the touch screen panel 22 as will be described more fully hereinafter. Used with the counters 174-180 inclusive are tables 182 (FIG. 13A) and 183 (FIG. 13B) which are stored in the memory 172 and controlled by the microprocessor 170. The table 182 includes a column 184 listing all of the currency denominations available for an amount tendering operation while column 184 of table 183 list all of the currency denominations available for change due operations. Both tables include a corresponding column 186 containing reference numerals identifying corresponding currency denominations used in determining the type of currency which is to make up the customer's payment options and change as will be described more fully hereinafter. The output count of the counter 174 corresponds to the reference numerals listed in column 186 and represent the corresponding currency denomination.

Figure 14:
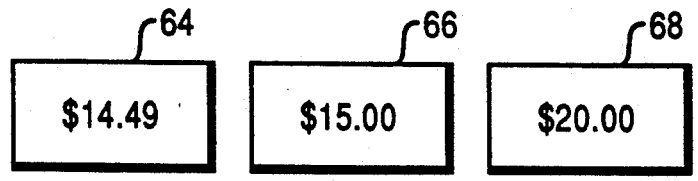
FIG. 14 illustrates one embodiment of the touch screen display showing the buttons displaying a cash payment amount which may be submitted by the customer in payment of the amount due.
Figure 15:
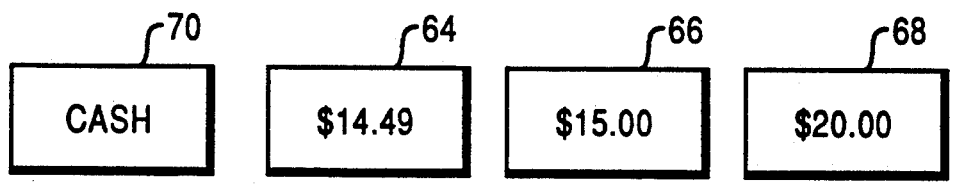
FIG. 15 is a second embodiment of the buttons associated with the touch screen display shown in FIG. 14.
Figure 16:
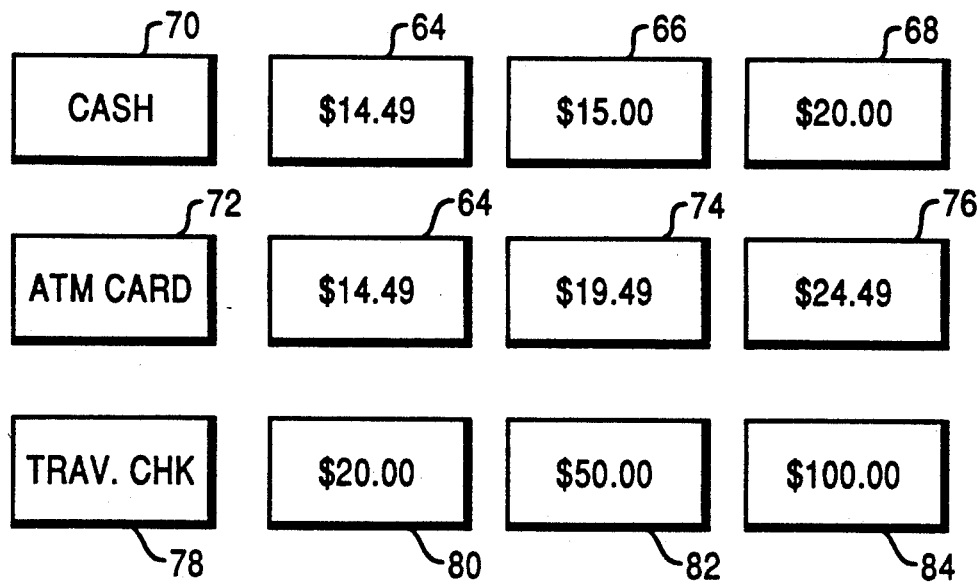
FIG. 16 is a third embodiment of the buttons associated with the touch screen display shown in FIG. 14.

Referring now to FIGS. 14-16 inclusive, there are shown displays on the touch screen panel 22 which may occur during the tendering portion of a checkout operation in which the customer will present currency as payment for the amount due for the purchased items. The displays shown in FIGS. 14-16 inclusive are based on the premise that most customers will pay for the amount due using one or more of the common denomination bills (1, 5, 10, 20). For example, if the balance due were $14.49, the most likely payments would be any one of a combination of one dollar bills, five dollar bills and/or ten dollar bills or even a twenty dollar bill. Therefore based on the amount due, the present invention generates displays which offer logical and likely payment options. Thus for the example shown in FIG. 14, the first display box or button 64 will display the exact amount due ($14.49). Next comes the one dollar denomination used to calculate the first factor of one greater than the amount due. This amount (fifteen dollars) is used to dynamically label the second display button 66. Next the five dollar denomination is used to calculate the first factor of five greater than the amount due. This amount, also fifteen dollars, has already been listed and will not be listed again. Next the ten dollar denomination is used to calculate the first factor of ten greater than the amount due. This amount (twenty dollars) is used to dynamically label the button 68. It will be seen from this arrangement that the number of keystrokes required of the operator to generate the amount due from the customer as a result of tendering one of the bills displayed in the display buttons 66 and 68 is held to a minimum. Otherwise the operator would have to use the keys on a numeric keyboard associated with the terminal device requiring the actuation of the 2 and the 0 keys together with the subtraction key and the keys representing the amount due for the purchase of the merchandise items.

If a "payment method" specifier is needed to be added, the button 70 (FIG. 15) would be added to the buttons in FIG. 14 illustrating that cash is the payment method. FIG. 16 illustrates other types of payment methods that may be displayed. Thus if an ATM card is presented as payment for the amount due, the buttons associated with the button 72 will be actuated by the operator. Where a traveler's check is presented for the amount due, the button 78 will be actuated by the operator. It will be seen from FIG. 16 that the buttons located on the screen will cover most of the types of payments by the customer that can occur. If the balance due was $14.49 and the customer pays with a twenty dollar bill, the operator, by touching the button 68, has specified the payment amount together with the payment method as well. If the customer had paid with his/her ATM card and wanted ten dollars back, then the operator would touch the button 76. In a similar manner, the use of a travelers check would result in the touching of the touch screen panel 22 adjacent the specific buttons 80-84 inclusive representing the amount of the travelers check. It will be seen that by touching one of the buttons 80-84 inclusive, the amount tendered and the method of payment will be transmitted to the control unit 36 (FIG. 3) for use in determining the change due to the customer.

Figure 17:
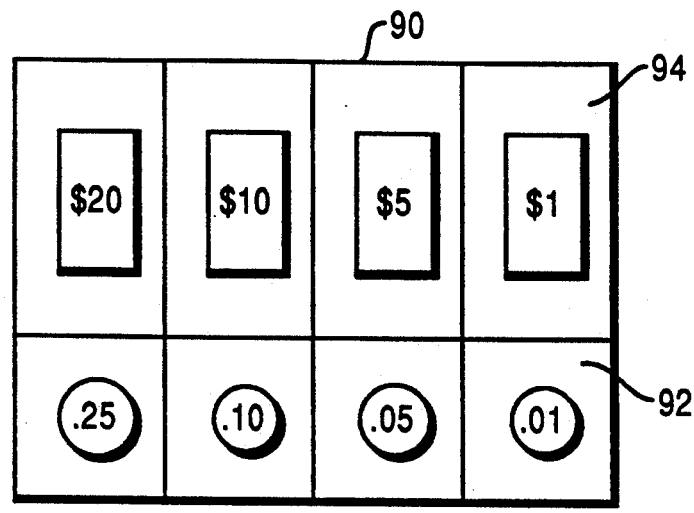
FIG. 17 is an illustration of a touch screen display representing a cash till indicating the location of the specific coin and bill compartments.

Referring now to FIG. 17, there is shown the display 90 which occurs at the same time the displays of FIG. 14-16 inclusive are occurring. The display 90 represents the outline of the cash till 26 (FIG. I) showing images of the particular coin compartments 92 and the bill compartments 94 with the designated value of the coins and bills which are to be found in each of the compartments. Upon the operator touching one of the buttons 66 or 68 (FIGS. 14 and 15), the display 90 will appear as the display 98 (FIG. 18) showing the location and the specific number of the coins and bills which are to be distributed to the customer as the change for the amount submitted by the customer. If a specific bill or coin associated with one of the compartments 92 and 94 in the cash till 26 (FIG. 1) is found to be empty, the operator will touch that particular button in the display 98 (FIG. 18) which results in the generation of the display 100 (FIG. 19) showing the amount of change due which is available to be given to the customer Thus, as shown in FIG. 19, if the change due is $38.63, the number of specific bills and coins which constitute the change will be shown. If there is no $10.00 bill in the cash till, the display 100 will be generated showing the specific number of available bills and coins which are to be distributed as the change due the customer as a result of the operator touching the ten dollar bill button. This operation may be repeated until a display is generated in which the currency is available for dispensing. It will be seen from this construction that the displays 90, 98 and 100 are dynamically changed in accordance with the type of payment selected by the customer and the currency available for dispensing as change and that the operator's task has been simplified from performing mental running totals to the counting of bills and coins. This simplification can in turn speed up the tendering process and increase transaction throughput.

Figure 20A:
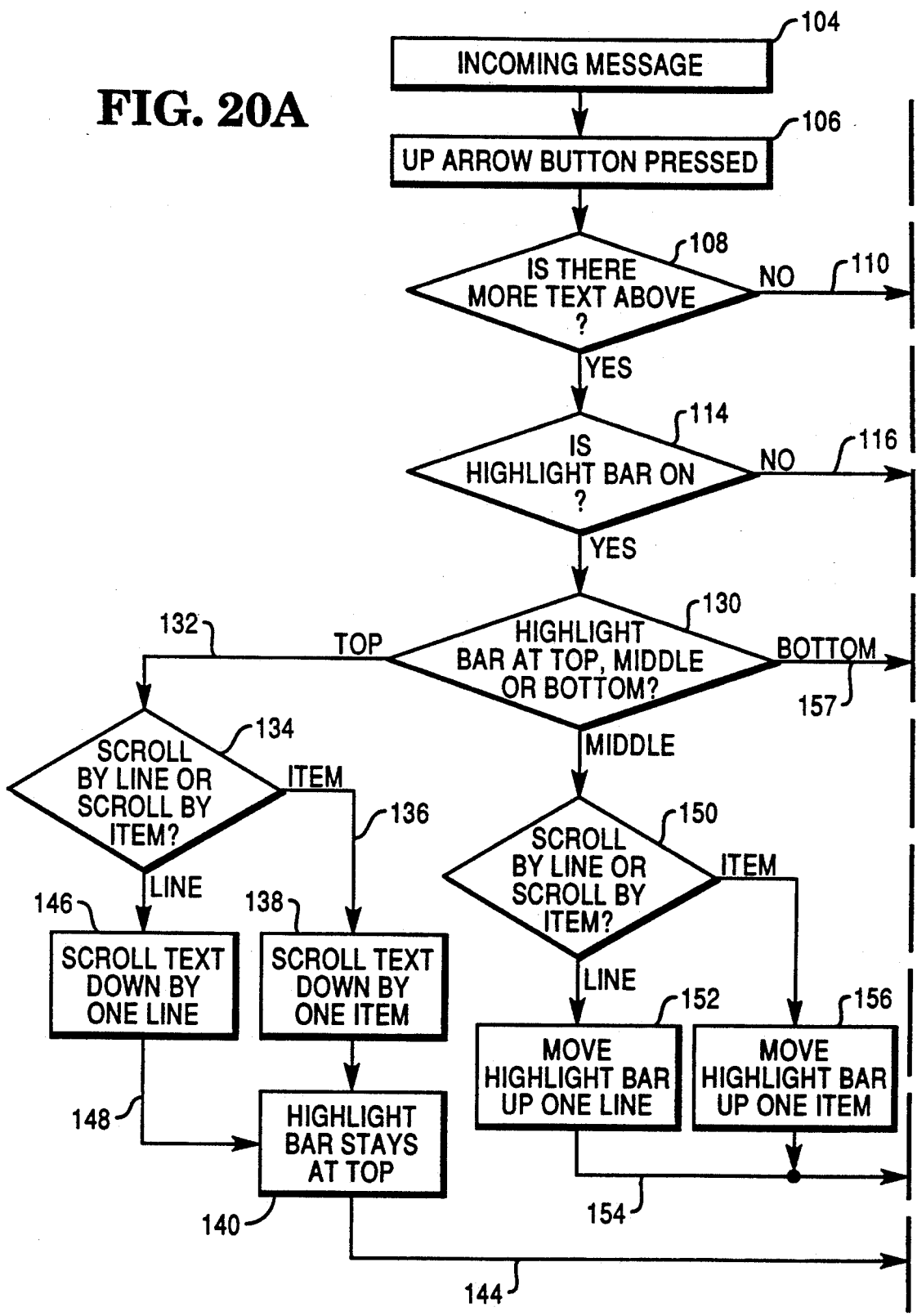
FIG. 20A and 20B taken together disclose a flow diagram showing the operation of the microprocessor in generating the electronic receipt displays shown in FIGS. 11A-11F inclusive.
Figure 20B:
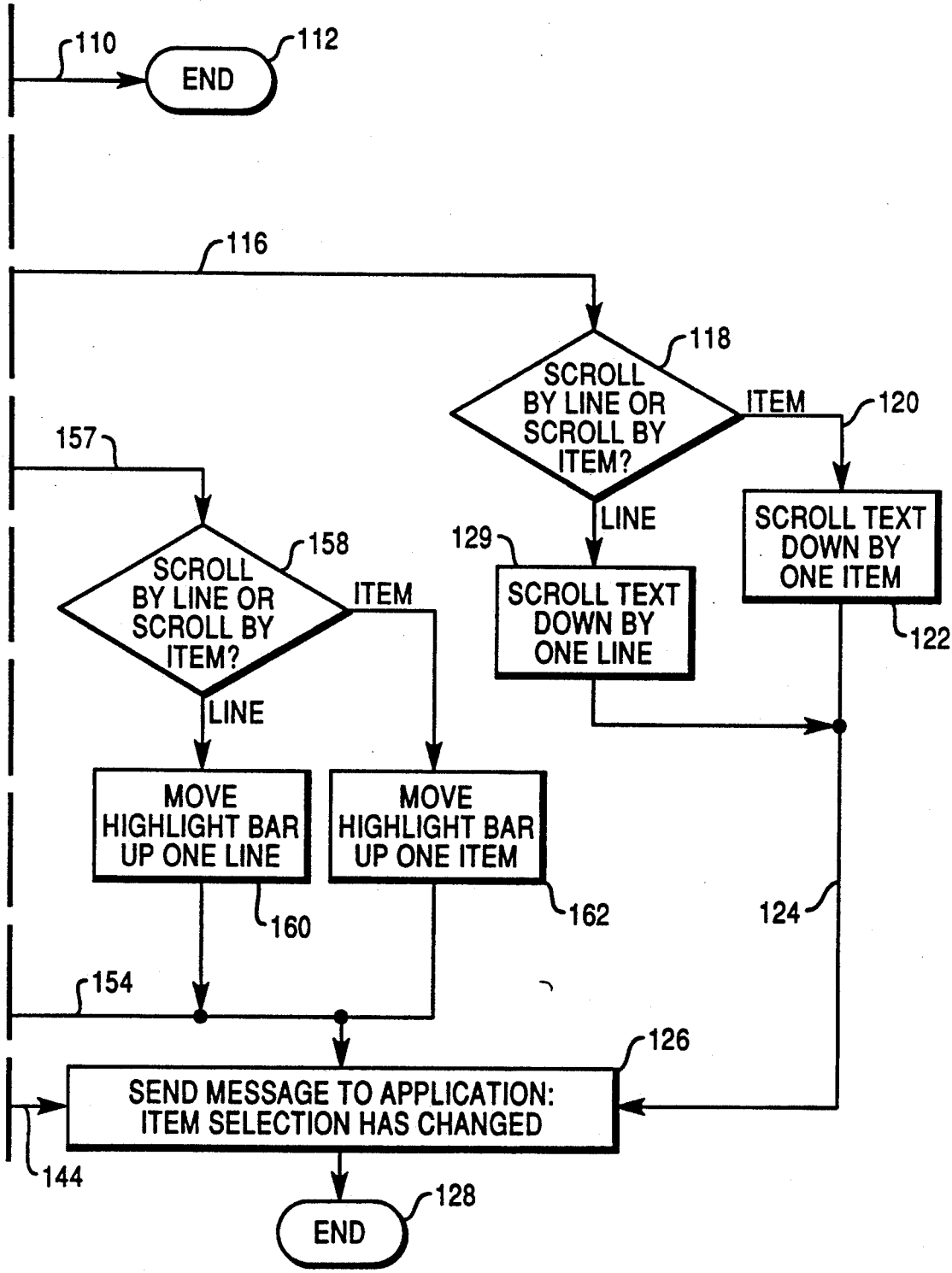

Referring now to FIGS. 20A and 20B, there is disclosed a flow diagram of the operation of the microprocessor 170 (FIG. 12) for controlling the movement of the highlight bar 52 as a result of touching the scroll buttons 46 and 48 (FIG. 7). The microprocessor 170, in response to the appearance of an encoded message (block 104) from the panel detector unit 34 (FIG. 3) indicating that the up arrow button 46 (FIG. 11C) has been touched (block 106), will determine if there is more text above the location which can be moved in an upward direction (block 108) and if there isn't, the microprocessor will proceed over line 110 and terminate the operation (block 112) (FIG. 20B). If there is more text above, the microprocessor will check to see if the highlight bar 52 (FIG. 11B) is on (block 114) and if it is not on, the microprocessor will proceed over line 116 and determine if the items in the receipt are to be scrolled either by line or by item (block 118)(FIG. 20B). If the items are to be scrolled item by item, the microprocessor will proceed over line 120 and scroll the text down by one item (block 122) and then proceed over line 124 to send a message to the application software that the item selection has changed (block 126) and then terminate the operation (block 128). If the scrolling is to be line by line, the microprocessor will scroll the text down by one line (block 129) and then proceed over line 122 to block 128.

If the highlight bar 52 is on (block 114)(FIG. 30A), the microprocessor will determine whether the highlight bar is located at the top, middle, or bottom of the receipt 40 (block 130). If the highlight bar is at the top of the receipt 40 (FIG. 11B), the microprocessor will proceed over line 132 and determine if the receipt is to be scrolled by line or by item (block 134). If the scrolling is to occur item by item, the microprocessor will proceed over line 136 and scroll down the text in the receipt by one item (block 138) with the highlight bar staying at the top (FIG. 11B)(block 140) and then proceed over line 144 to block 126 and block 128. If the receipt is to be scrolled by line, the microprocessor will scroll down the text by one line (block 146) and then proceed over line 148 to block 140 positioning the highlight bar at the top of the electronic receipt. If the highlight bar is at the middle of the receipt (FIG. 11E), the microprocessor will determine if the receipt 40 is to be scrolled by line or by item (block 150). If the scrolling is to occur by line, the microprocessor will move the highlight bar up one line (block 152) and proceed over line 154 to block 126. If the text is to be scrolled item by item, the microprocessor will move the highlight bar up one item (block 156) and terminate the operation over line 154 to block 126 and block 128.

If the highlight bar 52 is at the bottom of the receipt (FIG. 11F), the microprocessor will proceed over line 157 and determine if the scrolling of the text is to be by line or by item (block 158) (FIG. 20B). If the scrolling is to occur by line, the microprocessor will move the highlight bar up one line (block 160) and terminate the operation through blocks 126 and 128. If the scrolling is to occur by item, the microprocessor will move the highlight up one item (block 162) and terminate the operation through blocks 126 and 128. It will be seen from this operation that by touching the up button 46 (FIG. 8), the highlight bar 52 will either move in a vertical direction to highlight one of the items in the receipt or the text will move through the stationary highlight bar depending on the location of the highlight bar. Touching the down arrow 48 (FIG. 11A) results in the opposite movement.

Figure 21:
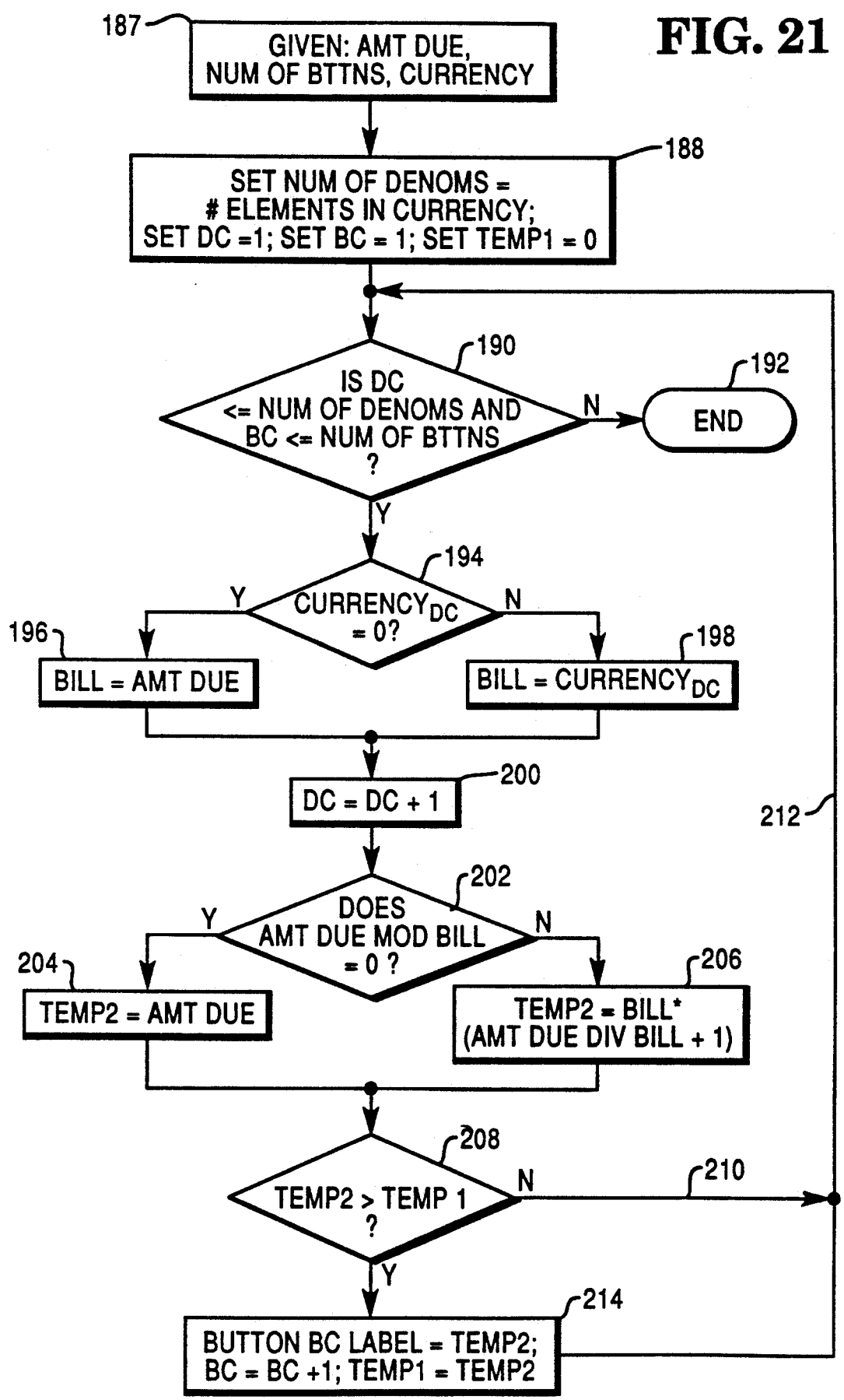
FIG. 21 is a flow diagram showing the operation of the microprocessor in generating the tendering option displays shown in FIGS. 14-16 inclusive.

Referring now to FIG. 21, there is shown a flow diagram of the operation of the microprocessor 170 for determining the type of bills and coins that are to be displayed representing the payment options that the customer may present as payment for the amount due for the purchased merchandise items( FIGS. 14-16 inclusive). Upon the generation of the amount due 62 (FIG. 9) and knowing the number of buttons that are available for use in the displays (FIG. 14-16 inclusive) together with the number of bills and coins that are available for dispensing (block 187) as listed in table 186 (FIG. 13A), the microprocessor 170 (FIG. 12) will store in the memory 172 (FIG. 12) a number equal to the number of different bills and coins that are available, Will set the denomination counter 174 (FIG. 12) to one representing the first currency denomination (zero) in table 186 (FIG. 13A), will set the button counter 176 to one and set the temporary (TEMp 1) counter 178 to one (block 188). The microprocessor Will then check to see if the value of the count of the denomination counter 174 is less than the number of currency denominations available and that the value in the button counter 176 is less than the number of buttons available (block 190). If they are not, the microprocessor will end the operation (block 192).

If the counts in the counters 174 and 176 are less than the number of currency denominations available and the number of buttons available, the microprocessor will check to see if the value of the denomination counter 174 is equal to zero (block 194). If it is, the microprocessor will generate the button 64 (FIGS. 14-16 inclusive) to display the bill denomination as the amount due for the purchased merchandise (block 196). With this arrangement, the button 64 (FIGS. 14-16 inclusive) will always be generated to display the amount due. If the denomination counter 174 is not equal to zero, the value of the bill being processed will be set equal to the currency denomination listed in table 186 (FIG. 13A) corresponding to the count in the counter 174 (block 198) and the microprocessor will increment the counter by one which represents the next currency denomination that is listed in the table 186 (block 200). The microprocessor will then determine what amount will be displayed as the next tendering option. This is accomplished by determining the number of the designated bills that are needed to pay off the amount due. To find this value, the microprocessor divides the value of the bill into the amount due and adds one to this value if the division had a remainder. This operation is represented by the term "AMT DUE MOD BILL" in block 202. If this resulting value is equal to zero (block 202), meaning that there was no remainder after the bill denomination is divided into the amount due, the microprocessor will set this value in the TEMP 2 counter 179 (FIG. 12) as the amount due (block 204) and check (block 208) to see if this value is greater than the value set in the TEMP 1 counter 178 (Block 188). If there is a remainder which is not equal to zero (block 202), the microprocessor will set a value in the TEMP 2 counter 180 equal to the bill denomination times a value equal to the number of times the bill denomination can be divided into the amount due plus one (block 206). This value is represented by the term "AMT DUE DIV BILL+1" in block 206. The microprocessor will then compare the value in the TEMP 2 counter 180 with the value in the TEMP 1 counter 178 (block 208) and if it is greater, the touch screen panel 22 will display the bill denomination in one of the buttons 66, 68 (FIGS. 14-16 inclusive) as one of the bills which may be submitted by the customer as payment for the amount due (block 214). If the value in the TEMP 2 counter is not greater than the value in the TEMP 1 counter, the microprocessor will proceed over the lines 210 and 212 and check to see if the value in the denomination counter 174 is less than the number of currency denominations available and that the number of buttons in the cash till compartments 92 and 94 (FIG. 17) is less than the number of buttons available (block 190). This process is repeated if necessary using the currency denominations listed in Table 182 (FIG. 13A) to provide the payment options shown in FIGS. 14-16 inclusive.

Figure 18:
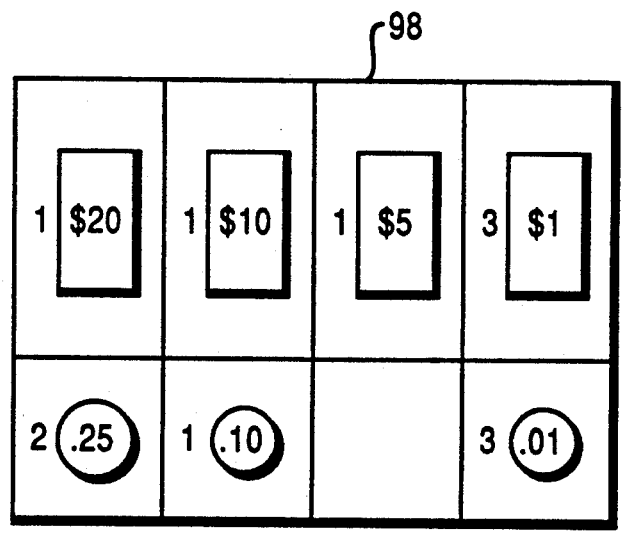
FIG. 18 is an illustration of the display of FIG. 17 after a specific dedicated cash payment has been made by the customer indicating the specific bills and coins which are to be removed from the cash till as the change due the customer.
Figure 19:
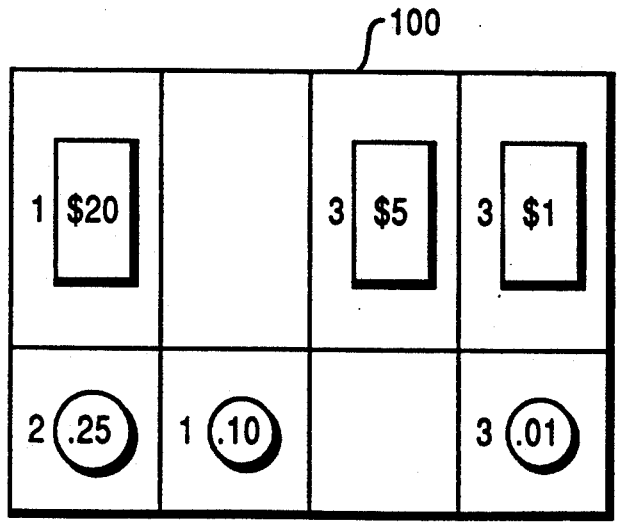
FIG. 19 is an illustration of a display similar to FIG. 18 which is generated after it was found that the ten dollar bill displayed in FIG. 18 was not available.
Figure 22:
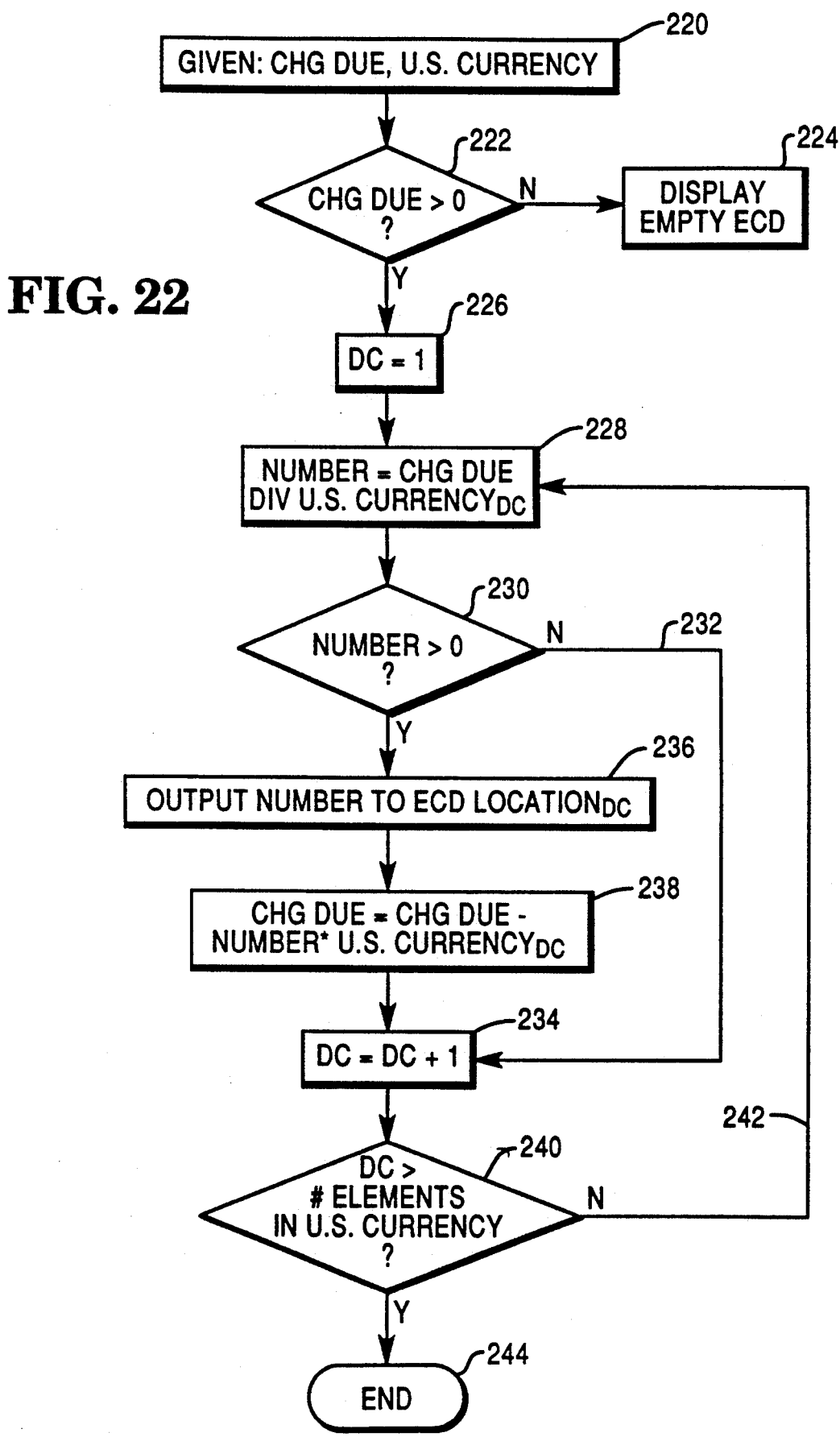
FIG. 22 is a flow diagram showing the operation of the microprocessor in generating the change due displays shown in FIGS. 18 and 19.

Referring now to FIG. 22, there is shown a flow diagram of the operation of the microprocessor for generating the displays shown in FIGS. 18 and 19 representing the particular bills and coins constituting the change which is to be given to the customer. The microprocessor 170, knowing the amount of change that is due as a result of subtracting the amount due from the bill tendered by the customer and the currency (bills and coins) that is available (block 220), will check to see if the change due is equal to zero (block 222) and if it is not, will generate the display 98 (FIG. 18) with the compartments 92, 94 shown as empty (block 224) which ends the operation.

If the change due is greater than zero (block 222),the microprocessor will set the denomination counter 174 (FIG. 12) to one (block 226) representing the first currency denomination in column 184 of table 183 (FIG. 13B) which in the present example is twenty. The microprocessor will then generate a number representing the change due divided by the currency denomination selected in block 226 (block 228) and check to see if that number is greater than zero (block 230). If the number is not greater than zero, the microprocessor will proceed over line 232 and increment the counter 174 (FIG. 12) by one (block 234) and then determine (block 240) if the new number representing the currency denomination is larger than the number of elements in the denomination column 184 of the Table 183 (FIG. 13B). If it is larger, the microprocessor will end the operation (block 244). If it is not larger, the microprocessor will proceed over line 242 and generate a new number as determined in block 228 representing the number of times the value of the currency denomination goes into the change due. If this number (block 230) is greater than zero, the microprocessor will output this number or value to the particular compartment location 92, 94 (FIGS. 18 and 19) (block 236)comprising a button representing the specific number of its associated currency denomination which is to be dispensed as part of the change due. The microprocessor will then establish a new change due (block 238) by subtracting from the original change a value representing the amount to be dispensed as found in block 236. The microprocessor will then increment the counter 174 (block 234) by one and then proceed to block 240 to determine if the new bill denomination is greater than the available currency elements. If it is not, the microprocessor will proceed over line 242 to block 228 to determine the number of times the new currency denomination goes into the new change due as found in block 238. This sequence is repeated until the display 98 (FIG. 18) is generated.

It will be seen that upon the generation of the amount of change due the customer for the particular bill denomination presented by the customer, the displays 98 (FIG. 18) and 100 (FIG. 19) will display buttons representing the particular bill and coin denominations that are available and the number of such denominations which constitute the change due the customer, utilizing the minimum amount of keystrokes by the checkout operator to accomplish this result.

While the features of the invention have been illustrated and described, it will be readily apparent to those skilled in the art that many changes and modifications can be made in the invention presented without departing from the spirit and true scope of the invention. Accordingly, the present invention should be considered as encompassing all such changes and modifications of the invention that fall within the broad scope of the invention as defined by the appended claims.

What is claimed is:

1. A method for operating a business terminal having a touch screen display device for processing the payment of purchased merchandise items comprising the steps of:

entering on aid business terminal a listing of amounts of merchandise purchased by a customer;

totaling said amounts by said terminal to obtain an amount due;

displaying on a display device a receipt representation including a listing of the merchandise items purchased by the customer and the amount due; and displaying on the display device a plurality of possible alternative payment amounts that may be submitted by the customer based upon the amount due as payment for the purchase of the merchandise items.

2. The method of claim 1 which further includes the step of entering into the terminal an amount tendered by the customer by touching the appropriate displayed payment amount, and the step of displaying the amount of change due the customer in response to touching a payment amount on the display device representing an amount that is tendered by the customer as payment for the purchase of the merchandise items.

3. The method of claim 2 in which the step of displaying the amount of change due the customer further includes the step of displaying on the display device a representation of bill and coin denominations together with the number of such denominations which comprises the change due the customer.

4. The method of claim 3 in which the step recited in claim 3 includes displaying on the display device a representation of a cash till including a number of bill and coin compartments displaying representations of the bills and coins located in the associated compartment together with the number of bills and coins comprising the change due the customer.

5. The method of claim 1 in which the business terminal has the capability of causing items displayed on the display device to change position thereon which further includes the step of superimposing on the receipt displayed on the display device a first designated area which when touched will move the items listed in the receipt in a first direction within the receipt.

6. The method of claim 5 which further includes the step of superimposing on the receipt displayed on the display device a second designated area which, when touched, will move the items listed in the receipt in a second direction within the receipt which is opposite to said first direction.

7. The method of claim 6 which further includes the steps of highlighting an established area on the receipt and causing an item listed in the receipt to be moved to said highlighted area in response to the touching of said first and second designated areas.

8. The method of claim 7 which further includes the steps of superimposing on the receipt a third designated area which when touched will allow the highlighted time to be changed or modified.

9. The method of claim 6 in which the first and second designated areas are represented by arrows oriented to point in said first and second directions respectively.

10. The method of claim 9 in which said third designated area is superimposed on the receipt between said arrows.

11. The method of claim 10 in which said third designated area is represented by an ellipse.

12. A method for operating a business terminal having a touch screen display device and a cash till for processing the payment for the purchase of a plurality of merchandise items comprising the steps of:

entering on said business terminal a listing of amounts of merchandise items purchased;

generating an amount due for the purchased merchandise items;

determining by the business terminal and displaying on the display device a plurality of images representing possible currency denominations that may be tendered by the customer for the amount due;

touching the image representing the currency denominations tendered by the customer;

determining by the business terminal of the amount of the change due to the customer from the amount tendered and the denominations which can make up said change due; and displaying on the display device the images of the currency denominations which are to be given to the customer as the change due from the currency denominations presented by the customer as payment for the amount due.

13. The method of claim 12 which includes the step of determining by inspection of the cash till the denominations of currency which are available for making change, the step of touching the image of the currency denomination which is not available for distribution to the customer as the change due and the step of displaying on the display device another plurality of images of currency denominations which are to be given to the customer as the change due.

14. The method of claim 12 in which the step of displaying on the touch screen display device the images of the currency denomination further includes the steps of:

generating by the terminal the amount of the change due the customer in response to the customer submitting a currency denomination which is greater than the amount due;

detecting the currency denominations that are available to be dispensed as change;

dividing a first available currency denomination into the change due amount to generate a number; and displaying this number adjacent the image of its associated currency denomination representing the number of its associated currency denomination which is to dispensed as a part of the change due the customer.

15. The method of claim 14 which further includes the steps of subtracting the value of the total amount dispensed of the first currency denomination from the change due and dividing a second of said currency denominations into the remaining change due to generate a second number and displaying this second number adjacent the image of its associated second currency denomination representing the number of the second currency denomination which is to be dispensed as a part of the change due the customer.

16. The method of claim 15 in which the steps of subtracting and dividing are repeated until no remainder is generated as a result of dividing one of the currency denominations into the remaining amount of the change due.

* * * * *

UNITED STATES PATENT AND TRADEMARK OFFICE
CERTIFICATE OF CORRECTION

PATENT NO. : 5,297,030
DATED : March 22, 1994
INVENTOR(S) : Ali M. Vassigh et al.

It is certified that error appears in the above-indentified patent and that said Letters Patent is hereby corrected as shown below:

Column 10, line 15, "aid" should be --said--.

Signed and Sealed this

Seventh Day of February, 1995

Attest:

BRUCE LEHMAN

Attesting Officer

Commissioner of Patents and Trademarks